United States Patent
Nagai

(10) Patent No.: US 9,333,812 B2
(45) Date of Patent: May 10, 2016

(54) PNEUMATIC TIRE WITH TREAD HAVING CAP PORTION, BASE PORTION AND CONDUCTIVE PORTION

(75) Inventor: Kunihiko Nagai, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 883 days.

(21) Appl. No.: 13/544,242

(22) Filed: Jul. 9, 2012

(65) Prior Publication Data
US 2013/0025753 A1 Jan. 31, 2013

(30) Foreign Application Priority Data
Jul. 26, 2011 (JP) ................................. 2011-163376

(51) Int. Cl.
*B60C 19/08* (2006.01)
*B60C 11/00* (2006.01)

(52) U.S. Cl.
CPC ............. *B60C 19/084* (2013.04); *B60C 11/005* (2013.01); *B60C 19/082* (2013.04); *B60C 11/0058* (2013.04); *B60C 11/0075* (2013.04)

(58) Field of Classification Search
CPC .. B60C 19/082; B60C 19/08; B60C 11/0058; B60C 11/0075
See application file for complete search history.

(56) References Cited

U.S. PATENT DOCUMENTS

| | | | |
|---|---|---|---|
| 5,937,926 A | 8/1999 | Powell | |
| 6,294,119 B1 * | 9/2001 | Nakamura | 152/152.1 |
| 6,302,173 B1 * | 10/2001 | Mizuno et al. | 152/152.1 |
| 6,951,233 B1 * | 10/2005 | Calvar et al. | 152/152.1 |
| 2005/0103411 A1 * | 5/2005 | Dheur et al. | 152/152.1 |

FOREIGN PATENT DOCUMENTS

| | | | |
|---|---|---|---|
| EP | 838353 A1 * | 4/1998 | |
| EP | 0 878 330 A2 | 11/1998 | |
| JP | 11-20426 A | 1/1999 | |
| JP | 11-139107 A | 5/1999 | |
| JP | 11-139107 A * | 5/1999 | |
| JP | 11-170814 A | 6/1999 | |
| JP | 2944908 B2 | 9/1999 | |
| JP | 2003-326614 A * | 11/2003 | |

OTHER PUBLICATIONS

Machine translation for Japan 2003-326614 (no date)).*
Machine translation for Japan 11-139107 (no date).*

(Continued)

*Primary Examiner* — Steven D Maki
(74) *Attorney, Agent, or Firm* — Westerman, Hattori, Daniels & Adrian, LLP

(57) ABSTRACT

A pneumatic tire has a tread rubber provided in an outer side of a carcass layer in a tread portion. the tread rubber has a cap portion which is formed by a non-conductive rubber and constructs a ground-contacting surface, a base portion which is provided in an inner side in the tire diametrical direction of the cap portion, and a conductive portion which is formed by a conductive rubber and extends in a thickness direction of the tread rubber so as to reach a bottom surface of the tread rubber from the ground-contacting surface. A thickness of the conductive portion is made relatively large in a center portion in the thickness direction of the tread rubber, and the thickness of the conductive portion is made relatively small in both end portions in the thickness direction of the tread rubber.

4 Claims, 5 Drawing Sheets

(56) References Cited

OTHER PUBLICATIONS

Machine translation for EP 838,353 (no date).*
Japanese Office Action dated Jun. 28, 2013, issued in corresponding Japanese Patent Application No. 2011-163376, w/ English translation.
Chinese Office Action dated Sep. 25, 2014, issued in corresponding CN Application No. 201210239612.7 with English translation (15 pages).
Japanese Office Action mailed Apr. 9, 2013, issued in corresponding Japanese Patent Application No. 2011-163376; with English translation (4 pages).
Extended European Search Report dated Nov. 6, 2012, issued in corresponding European Patent Application No. 12175570.6.
Office Action dated Mar. 24, 2014, issued in corresponding Chinese Patent Application No. 201210239612.7, with English Translation (13 pages).

* cited by examiner (A)

(B)

(C)

PNEUMATIC TIRE WITH TREAD HAVING CAP PORTION, BASE PORTION AND CONDUCTIVE PORTION

BACKGROUND OF THE INVENTION

1. Field of the Invention

The present invention relates to a pneumatic tire which can discharge static electricity generated in a vehicle body and a tire to a road surface.

2. Description of the Related Art

Recently, there have been proposed a pneumatic tire including a tread rubber blended with silica at a high ratio in order to reduce the rolling resistance that largely affects the fuel consumption of a vehicle and/or to increase braking performance (WET braking performance) on a wet road surface. However, compared to a tread rubber blended with carbon black at a high ratio, the electric resistance of such tread rubber is high, and accordingly, static charge generated on a vehicle body or the tire is prevented from being released to the road surface. As a result, problems like radio noises tend to occur.

Accordingly, there has been developed a pneumatic tire which can achieve electrical conduction performance by forming a conductive portion which is made of a conductive rubber blended with carbon black or the like, in a tread rubber which is made of a non-conductive rubber blended with silica or the like. For example, in a tire described in Patent Documents 1 to 3, as shown in FIGS. 5 to 8, tread rubbers 10a to 10d having a cap portion made of a non-conductive rubber are provided with conductive portions 18 to 21 dividing the tread rubbers in a tire width direction, thereby forming a conductive path for discharging static electricity.

Meanwhile, according to a study of the present inventor, it is found that in the tread rubber 10a in FIG. 5, a support from a lateral direction by the conductive portion 18 is not sufficient with respect to the non-conductive rubber at the time of cornering, rigidity between an outer side and an inner side of the tire is off balance, and steering stability tends to be lowered. The steering stability is likely to improve by increasing a thickness of the conductive portion 18, however, in this case, an improving effect by using the non-conductive rubber for the tread rubber, that is, an effect of reducing a rolling resistance and an effect of improving wet braking performance will be sacrificed.

On the other hand, in the tread rubber 10b in FIG. 6, a contact area of the conductive portion 19 with respect to the non-conductive rubber is large as compared with the tread rubber 10a, and it is comparatively easy to secure the steering stability. However, since a thickness of the conductive portion 19 is uniform, the non-conductive rubber cannot be sufficiently supported and the steering stability tends to be lowered if the thickness is small, and this is disadvantageous in view of forming efficiency of the tread rubber. Further, if the thickness of the conductive portion 19 is large, the improving effect by using the non-conductive rubber for the tread rubber will be sacrificed.

In the tread rubber 10c in FIG. 7, since the thickness of the conductive portion 20 becomes large in a bottom surface side of the tread rubber 10c, and a volume of a base portion greatly contributing to the reduction of the rolling resistance is reduced, the effect of reducing the rolling resistance tends to be deteriorated. Further, a support from a lateral direction by the conductive portion 20 is not sufficient with respect to the non-conductive rubber at the time of cornering, and steering stability tends to be lowered.

In the tread rubber 10d in FIG. 8, a contact area of the conductive portion 21 with respect to the non-conductive rubber is large as compared with the tread rubber 10a, and it is comparatively easy to secure the steering stability. However, since the thickness of the conductive portion 21 is large in the bottom surface side of the tread rubber 10d and the volume of the base portion is reduced, the effect of reducing the rolling resistance tends to be deteriorated. In addition, since the thickness of the conductive portion 21 is large in the ground-contacting surface side, and the non-conductive rubber in contact with the road surface is reduced, the effect of improving the wet braking performance tends to be deteriorated.

PRIOR ART DOCUMENTS

Patent Document 1: Japanese Patent No. 2944908
Patent Document 2: Japanese Unexamined Patent Publication No. 11-139107
Patent Document 3: Japanese Unexamined Patent Publication No. 11-20426

SUMMARY OF THE INVENTION

The present invention is made in view of the above circumstances, and an object thereof is to provide a pneumatic tire which can favorably achieve an effect of reducing a rolling resistance and an effect of improving wet braking performance as well as securing steering stability.

The object can be achieved by the following present invention. That is, the present invention provides a pneumatic tire comprising a pair of bead portions, side wall portions each of which extends to an outer side in a tire diametrical direction from each of the bead portions, a tread portion which is connected to an outer end in the tire diametrical direction of each of the side wall portions, a toroidal carcass layer which is provided between the pair of the bead portions, and a tread rubber which is provided in an outer side of the carcass layer in the tread portion, wherein the tread rubber has a cap portion which is formed by a non-conductive rubber and constructs a ground-contacting surface, a base portion which is provided in an inner side in the tire diametrical direction of the cap portion, and a conductive portion which is formed by a conductive rubber and extends in a thickness direction of the tread rubber so as to reach a bottom surface of the tread rubber from the ground-contacting surface, and a thickness of the conductive portion is made relatively large in a center portion in the thickness direction of the tread rubber, and the thickness of the conductive portion is made relatively small in both end portions in the thickness direction of the tread rubber.

According to the structure described above, it is possible to make a thickness of the conductive portion large in the center portion in the thickness direction of the tread rubber, and a contact area of the conductive portion with respect to the non-conductive rubber becomes larger as compared with the tread rubber as shown in FIG. 5. Accordingly, it is possible to sufficiently support the non-conductive rubber by the conductive portion from the lateral direction at the time of cornering, and to maintain a rigidity balance between the outer side and the inner side of the tire so as to secure the steering stability. Further, since the thickness of the conductive portion becomes small in both end portions in the thickness direction of the tread rubber, it is possible to secure the volume of the base portion and the non-conductive rubber coming into contact with the road surface, whereby the effect of reducing the rolling resistance and the effect of improving the wet braking performance are favorably achieved.

In addition, according to the present invention, since the thickness of the conductive portion is made large in the center portion in the thickness direction of the tread rubber, it is possible to make forming efficiency of the tread rubber advantageous in the case of forming the tread rubber by an extrusion molding method. In other words, since an extruding speed at the time of co-extruding a plurality of rubbers needs to be matched with an extruding speed of the rubber having a minimum cross-sectional area, the extruding speed tends to be slow on the whole. However, in the present invention, since the thickness of the conductive portion is large in the center portion in the thickness direction of the tread rubber, and the cross-sectional area of the conductive portion can be made properly large, it is possible to accelerate the extruding speed so as to enhance the forming efficiency of the tread rubber.

In the present invention, it is preferable that the conductive portion is formed in an approximately crescent shape in a tire meridian cross-section. According to the structure described above, since the side surfaces in both sides of the conductive portion are formed in the shape curved to the same direction in the tire width direction, and the non-conductive rubber can be sufficiently supported from the lateral direction at the time of cornering, even if the thickness of the conductive portion is small as a whole, it is possible to maintain the rigidity balance between the outer side and the inner side of the tire so as to secure the steering stability. Further, it is possible to suppress the volume of the conductive rubber so as to achieve the effect of reducing the rolling resistance and the effect of improving the wet braking performance.

DETAILED DESCRIPTION OF THE PREFERRED EMBODIMENTS

Figure 1:
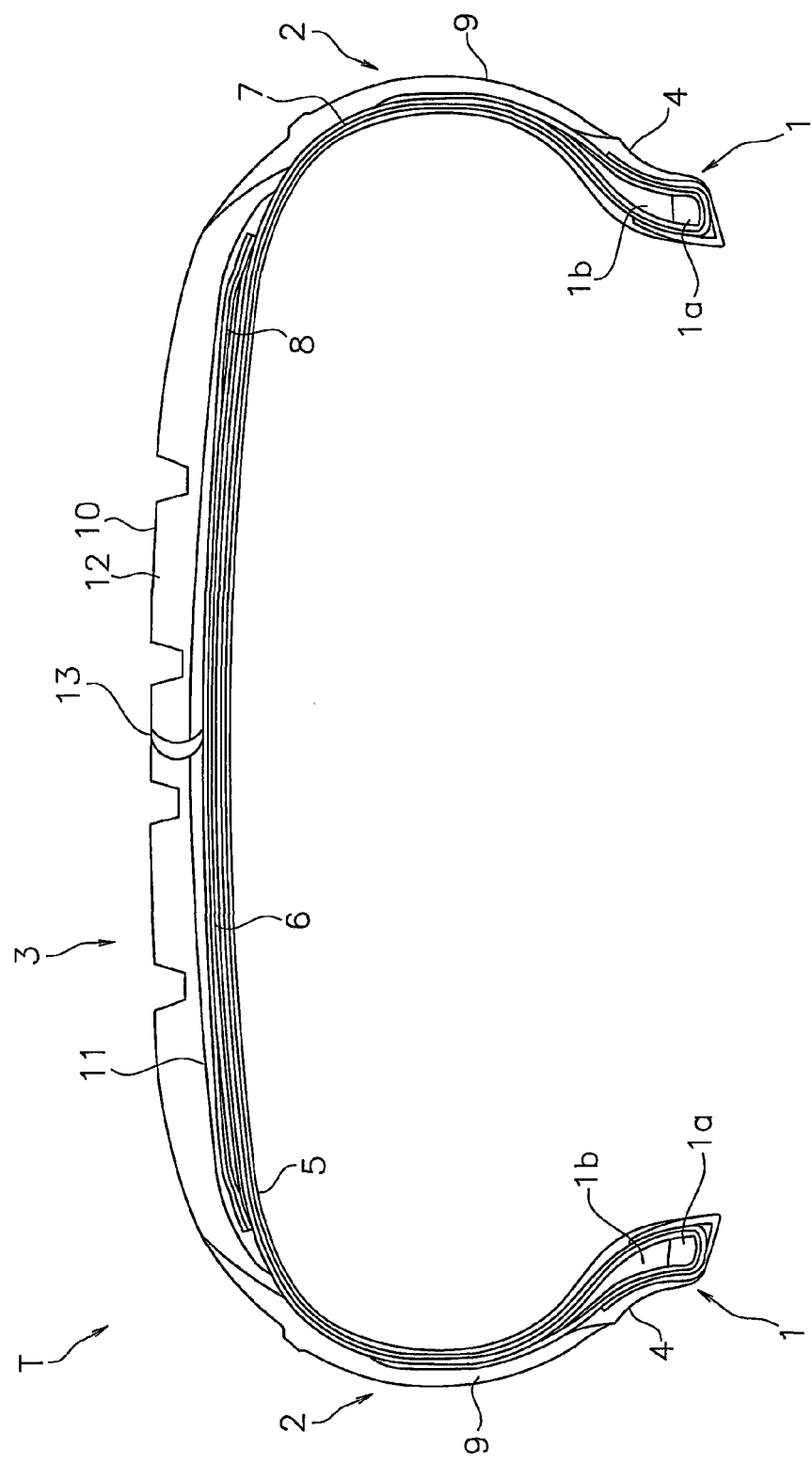
FIG. 1 is a cross sectional view of a tire meridian showing one example of a pneumatic tire according to the present invention.

An embodiment of the present invention will be explained with reference to the drawings. A pneumatic tire T shown in FIG. 1 includes a pair of bead portions 1, side wall portions 2 extending from the bead portions 1 to outer side in a tire diametrical direction, a tread portion 3 connected to outer ends in a tire diametrical direction of the side wall portions 2. The bead portion 1 includes an annular bead 1a composed of a bundle of steel wires or the like sheathed with rubber and a bead filler 1b of hard rubber disposed therein.

A toroidal carcass layer 7 is provided between the pair of bead portions 1, and an end portion thereof is fixed via the bead 1a being wound thereon. The carcass layer 7 is constructed by at least one (two in the present embodiment) carcass plies, and the carcass ply is formed by covering a cord extending at an angle of approximately 90 degree with respect to a tire circumferential direction with a topping rubber. The carcass layer 7 is provided with an inner liner rubber 5 for maintaining air pressure on the inner periphery thereof.

A rim strip rubber 4 which abuts on a rim (not shown) at a time of being installed to the rim is provided in an outer side of the carcass layer 7 in the bead portion 1. Also, aside wall rubber 9 is provided in an outer side of the carcass layer 7 in the sidewall portion 2. In the present embodiment, the topping rubber of the carcass layer 7 (the topping rubber of the carcass ply), the rim strip rubber 4, a belt layer 6 and a belt reinforcing layer 8 described below are formed by conductive rubber respectively, and the side wall rubber 9 is formed by nonconductive rubber.

An outer side of the carcass layer 7 in the tread portion 3 is provided with the belt layer 6 which is constructed by a plurality of (two in the present embodiment) belt plies, the belt reinforcing layer 8 which is formed by coating cords extending substantially in a tire circumferential direction with a topping rubber, and a tread rubber 10. Each of the belt plies is formed by covering cords extending while inclining with respect to the tire circumferential direction with a topping rubber, and is laminated in such a manner that the cord intersects inversely to each other between the plies. The belt reinforcing layer 8 may be omitted as occasion demands.

The tread rubber 10 has a cap portion 12 which is formed by a non-conductive rubber and constructs a ground-contacting surface, a base portion 11 which is provided in an inner side in a tire diametrical direction of the cap portion 12, and a conductive portion 13 which is formed by a conductive rubber and extends in a thickness direction of the tread rubber 10 so as to reach a bottom surface of the tread rubber 10 from the ground-contacting surface. The base portion 11 is made of a different kind of rubber from the cap portion 12, and a rubber which is excellent in low heating property, for example, tan δ at 25° C. is equal to or less than 0.35, is employed. In the present embodiment, there is shown an example in which the base portion 11 is formed by the non-conductive rubber, however, the base portion 11 may be formed by the conductive rubber.

The conductive rubber points to a rubber in which a specific volume resistance is less than $10^8$ Ω·cm, and is produced, for example, by blending a carbon black serving as a reinforcing agent in a raw material rubber at a high ratio. The conductive rubber can be obtained by blending a predetermined amount of known conductivity applying material such as a carbon including a carbon fiber, a graphite and the like, or a metal including a metal powder, a metal oxide, a metal flake, a metal fiber and the like in addition to the carbon black. Further, the nonconductive rubber points to a rubber in which a specific volume resistance is equal to or more than $10^8$ Ω·cm, and is produced, for example, by blending a silica serving as the reinforcing agent in the raw material rubber at a high ratio.

As for the raw material rubber mentioned above, the following are exemplified; i.e., natural rubber, styrene-butadiene rubber (SBR), butadiene rubber (BR), isoprene rubber (IR), butyl rubber (IIR) and the like. These materials may be used alone or in combination. The above raw rubber is appropriately blended with a curing agent, a cure accelerator, a plasticizer, an antioxidant and the like.

It is preferable that the conductive rubber forming the conductive portion 13 has a composition which satisfies such a relationship that a nitrogen adsorption specific surface area $N_2SA$ (m$^2$/g)×compounding amount (mass %) of the carbon black is equal to or more than 1900, preferably equal to or more than 2000, and a dibutyl phthalate oil absorption DBP (ml/100 g)×compounding amount (mass %) of the carbon black is equal to or more than 1500, preferably equal to or more than 1700, in the light of enhancing the durability of the conductive portion 13 so as to improve the conductive performance. $N_2SA$ is determined in conformity with ASTM D3037-89, and DBP is determined in conformity with ASTM D2414-90.

The conductive portion 13 is provided in such a manner as to divide the tread rubber 10 in the tire width direction, an upper end thereof is exposed to the ground-contacting surface, and a lower end thereof is exposed to the bottom surface of the tread rubber 10 so as to be connected to the belt reinforcing layer 8. The static electricity generated in the vehicle body and the tire is discharged to the road surface through a conductive path from the rim via the rim strip rubber 4, the carcass layer 7, the belt layer 6, the belt reinforcing layer 8, and the conductive portion 13. In the case where the base portion 11 is formed by the conductive rubber, a conductive path from the rim via the rim strip rubber 4, the carcass layer 7, the base portion 11, and the conductive portion 13 is obtained.

The ground-contacting surface in which the conductive portion 13 exposes indicates a surface of the tread portion 10 which is grounded on the road surface at a time of assembling in a normal rim, vertically putting the tire on the flat road surface in a state in which a normal internal pressure is charged, and applying a normal load. The normal rim is a rim which is determined per tire by a standard system including a standard on which the tire is based, for example, is a standard rim in JATMA, "Design Rim" in TRA, or "Measuring Rim" in ETRTO.

The normal internal pressure is a pneumatic pressure determined per tire by a standard system including a standard on which the tire is based, and is a maximum pneumatic pressure in JATMA, a maximum value described in Table "TIRE LOAD LIMITS AT VARIOUS COLD INFLATION PRESSURES" in TRA, or "INFLATION PRESSURE" in ETRTO, however, in the case that the tire is for a passenger car, it is set to 180 kPa. Further, the normal load is a load determined per tire by a standard system including a standard on which the tire is based, and is a maximum load capacity in JATMA, a maximum value described in the above Table in TRA, or "LOAD CAPACITY" in ETRTO, however, in the case that the tire is for a passenger car, it is set to 85% of a corresponding load to 180 kPa.

Figure 2:
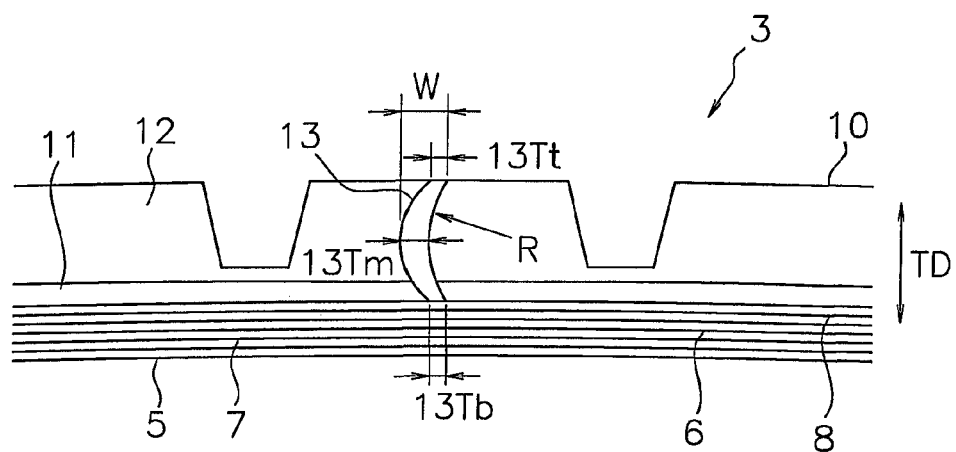
FIG. 2 is a cross sectional view showing a conductive portion of FIG. 1 in an enlarged manner.

As shown in FIG. 2 in an enlarged manner, the thickness of the conductive portion 13 in the center portion in the thickness direction TD of the tread rubber 10 is made relatively large, and the thickness of the conductive portion 13 in both endportions in the thickness direction TD of the tread rubber 10 is made relatively small. Specifically, assuming that a thickness of the conductive portion 13 in the center in the thickness direction TD is 13 Tm, a thickness of the conductive portion 13 in the ground-contacting surface is 13 Tt, and a thickness of the conductive portion 13 in the bottom surface of the tread rubber 10 is 13 Tb, relationships 13 Tm>13 Tt and 13 Tm>13 Tb are satisfied.

The thickness 13 Tm is set, for example, from 0.6 to 1.5 mm. When the thickness 13 Tm is equal to or more than 0.6 mm, it is possible to easily secure the steering stability, and when it is equal to or less than 1.5 mm, it is possible to suppress the volume of the conductive rubber, whereby the effect of reducing the rolling resistance and the effect of improving the wet braking performance can be favorably achieved. Further, a whole width W of the conductive portion 13 is set, for example, from 1.5 to 3.5 mm.

The thickness 13 Tt is set, for example, from 0.1 to 0.5 mm. When the thickness 13 Tt is equal to or more than 0.1 mm, it is possible to easily secure the conducting performance, and when it is equal to or less than 0.5 mm, it is possible to more favorably achieve the effect of improving the wet braking performance. Further, the thickness 13 Tb is set, for example, from 0.1 to 0.4 mm. When the thickness 13 Tb is equal to or more than 0.1 mm, it is possible to easily secure the conducting performance, and when it is equal to or less than 0.4 mm, it is possible to more favorably achieve the effect of reducing the rolling resistance.

In the present embodiment, the conductive portion 13 is formed in an approximately crescent shape in a tire meridian cross-section, and the side surfaces in both sides of the conductive portion 13 are formed in a shape curved to the same direction in the tire width direction. Accordingly, even if the thickness of the conductive portion 13 is small as a whole, it is possible to sufficiently support the non-conductive rubber (the cap portion 12) from the lateral direction at the time of cornering so as to secure the steering stability. Further, it is possible to suppress the volume of the conductive rubber so as to achieve the effect of reducing the rolling resistance and the effect of improving the wet braking performance. In this shape, a radius of curvature R is set, for example, from 5 to 45 mm.

The tread rubber 10 having the conductive portion 13 as described above can be easily obtained by an extrusion molding method. In the extrusion molding method, a tread rubber having a predetermined cross-sectional shape is formed in a band shape by co-extruding the cap portion 12, the base portion 11, and the conductive portion 13, and the annular tread rubber 10 is formed by jointing the end portions. In the present invention, since the cross-sectional area of the conductive portion 13 can be made properly large, it is possible to accelerate the extruding speed in the co-extrusion so as to enhance the forming efficiency of the tread rubber.

The pneumatic tire in accordance with the present invention is the same as a normal pneumatic tire except that the tread rubber as mentioned above is provided, and the known material, shape, structure, manufacturing method and the like can be applied to the present invention.

The present invention is not limited to the embodiment mentioned above, but can be improved and modified variously within the scope which does not depart from the purpose of the present invention.

[Other Embodiment]

Figure 3:
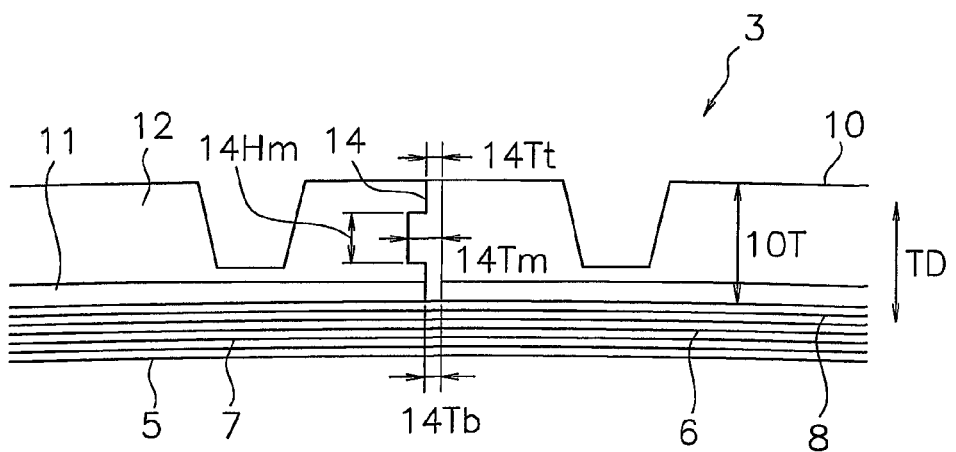
FIG. 3 is a cross sectional view showing a tread rubber in accordance with other embodiment of the present invention.

(1) In the embodiment described above, there is shown the example in which the conductive portion is formed in the approximately crescent shape in the tire meridian cross-section. However, the present invention is not limited thereto, and the conductive portion may be constructed, for example, by a conductive portion 14 which is formed in a lateral T-shaped form as shown in FIG. 3. In the conductive portion 14 as well, the thickness in the center portion in the thickness direction TD of the tread rubber 10 is relatively large, and the thickness in both end portions in the thickness direction TD of the tread rubber 10 is relatively small.

In the example in FIG. 3, a thickness 14 Tm of the conductive portion 14 in the center in the thickness direction TD is set, for example, from 0.6 to 1.5 mm. Further, a thickness 14 Tt of the conductive portion 14 in the ground-contacting surface is set, for example, from 0.1 to 0.9 mm, and a thickness 14 Tb of the conductive portion 14 in the bottom surface of the tread rubber 10 is set, for example, from 0.1 to 0.4 mm. In this shape, a height 14 Hm of a portion at which the thickness of the conductive portion 14 is large is set, for example, from 40 to 60% of the thickness 10 T of the tread rubber 10.

Figure 4:
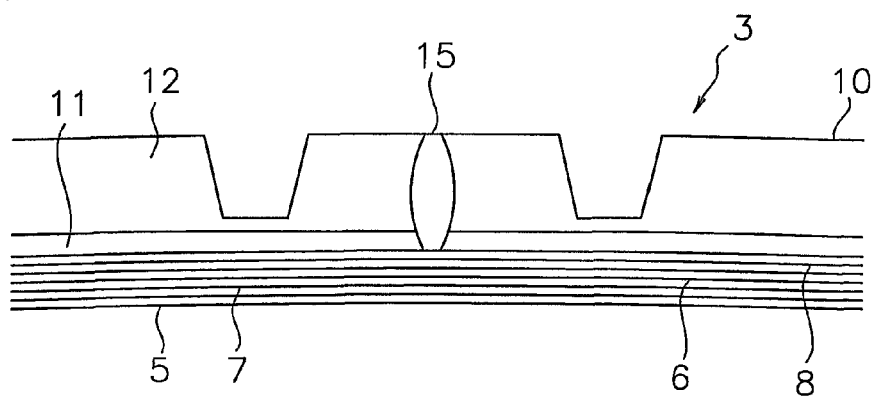
FIG. 4 is a cross sectional view showing a tread rubber in accordance with other embodiment of the present invention.
Figure 4:
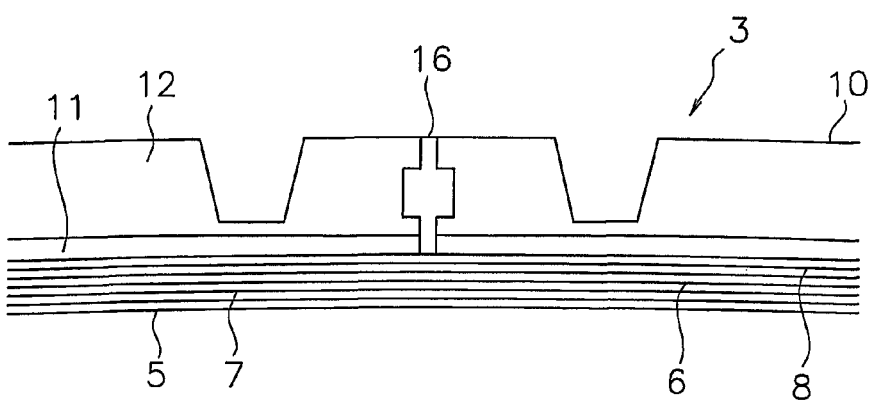
Figure 4:
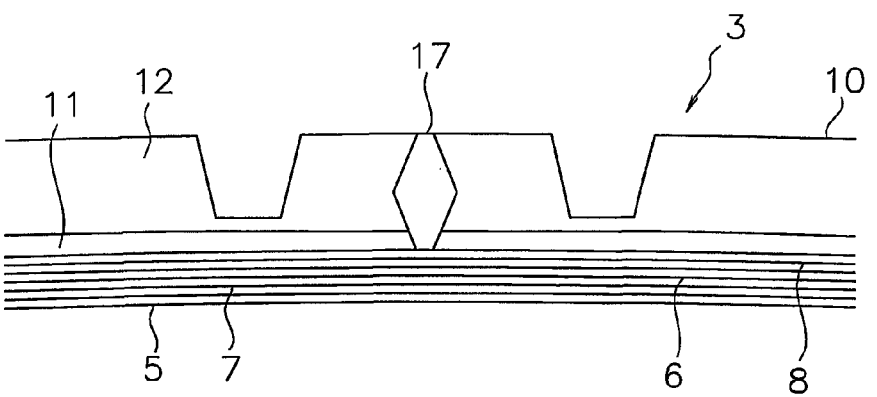

(2) FIGS. 4 (A) to 4 (C) show another example of the conductive portion which can be employed in the present invention. FIG. 4(A) is an example in which side surfaces in both sides of the conductive portion 15 are curved to a different direction in the tire width direction, FIG. 4(B) is an example in which the conductive portion 16 is formed in a cross shape in a cross-section, and FIG. 4(C) is an example in which side surfaces in both sides of the conductive portion 17 are bent to a different direction in the tire width direction. As long as the thickness of the conductive portion in the ground-contacting surface and the bottom surface of the tread rubber 10 is the same, the volume of the conductive rubber is further suppressed in the conductive portions 13 and 14 in FIGS. 2 and 3 as compared with the conductive portions 15 to 17 in FIG. 4, and the conductive portions 13 and 14 are excellent in the effect of reducing the rolling resistance and the effect of improving the wet braking performance.

(3) The present invention may be structured such that a plurality of conductive portions appear on the tire meridian cross-section, however, in view of reducing the volume of the conductive rubber as much as possible, it is preferable to structure such that one conductive portion appears on the tire meridian cross-section as in the embodiment described above. In this case, it is preferable to arrange the conductive portion so as to pass through a tire equator (a center line) in order to improve uniformity in the lateral direction of the tire.

EXAMPLE

An example which concretely shows the structure and effect of the present invention will be explained. An evaluation of each of performances is executed as follows.

(1) Steering Stability

A tire was installed to an actual car (domestic sedan car of 1.5 L class), straight moving travel and cornering travel were performed in a state where a load of one driver riding the car was applied under a pneumatic pressure designated by a vehicle, and an evaluation was carried out according to a feeling test of the driver. The evaluation was carried out by an index number by setting a result of Conventional Example to 100, and larger numerical value indicates more excellent steering stability.

(2) Rolling Resistance

A rolling resistance at a speed 80 km/h was measured on the basis of an international standard ISO28580 (JISD4234), and an inverse number thereof was calculated. The evaluation was carried out by an index number by setting a result of Conventional Example to 100, and larger numerical value indicates more excellent rolling resistance.

(3) Wet Braking Performance

The tire was installed to the actual car described above so as to travel on a wet road surface, ABS braking was carried out from a speed of 100 km/h to 0 km/h, and an inverse number of a braking distance measured by the fifth wheel was calculated. The evaluation was carried out by an index number by setting a result of Conventional Example to 100, and larger numerical value indicates more excellent wet braking performance.

(4) Conducting Performance

Conducting performance was evaluated by setting the case where the conductive path, which can discharge static electricity to the road surface, exists as ◯, and setting the case where it does not exist as ×.

A size of the tire set for the evaluation is 195/65R15, and a tire structure and a rubber composition in each of the examples are in common except for the shape of the conductive portion. A dimension of the conductive portion is as shown in Table 1, however, the conductive portion was not provided in Conventional Example, a height 21 Hm of a portion in which the thickness of the conductive portion 21 becomes small was set to 4 mm in Comparative Example 4, a radius of curvature R of the conductive portion 13 was set to 30 mm in Working Example 1, and a height 14 Hm of a portion in which the thickness of the conductive portion 14 becomes large was set to 4 mm in Working Example 2. Results of the evaluation are shown in Table 1.

TABLE 1

Figure 5:
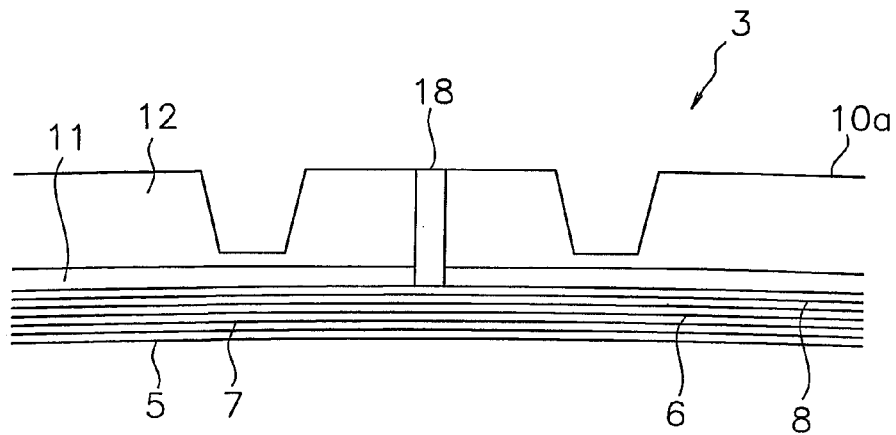
FIG. 5 is a cross sectional view showing a tread rubber in accordance with Comparative Example 1.
Figure 6:
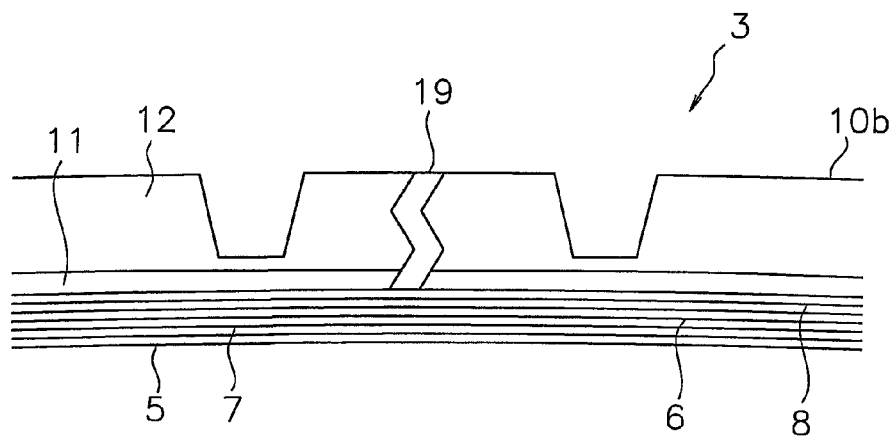
FIG. 6 is a cross sectional view showing a tread rubber in accordance with Comparative Example 2.
Figure 7:
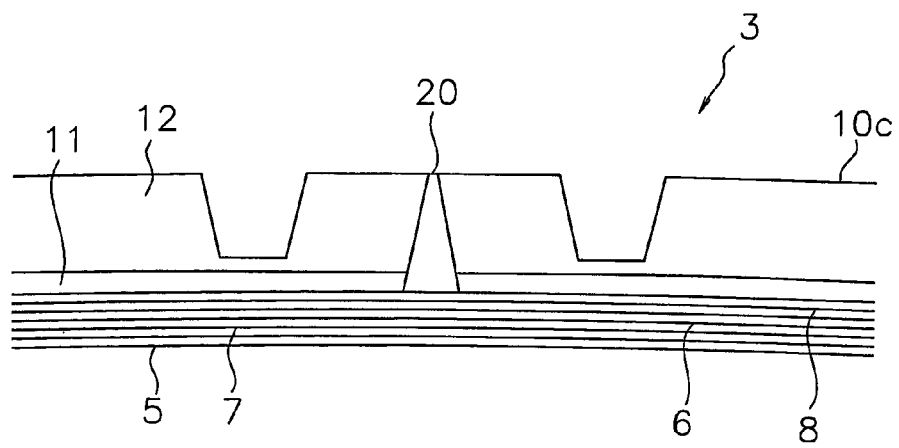
FIG. 7 is a cross sectional view showing a tread rubber in accordance with Comparative Example 3.
Figure 8:
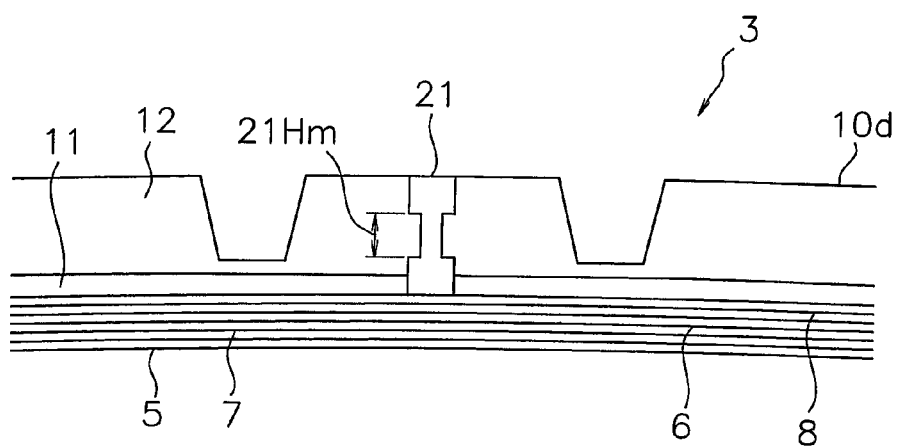
FIG. 8 is a cross sectional view showing a tread rubber in accordance with Comparative Example 4.

| | | Conventional Example | Comparative Example 1 | Comparative Example 2 | Comparative Example 3 | Comparative Example 4 | Working Example 1 | Working Example 2 |
|---|---|---|---|---|---|---|---|---|
| Shape of conductive portion | | none | FIG. 5 | FIG. 6 | FIG. 7 | FIG. 8 | FIG. 2 | FIG. 3 |
| Thickness of conductive portion (mm) | Ground-contacting surface | — | 1 | 1 | 0.3 | 1 | 0.3 | 0.3 |
| | Center | — | 1 | 1 | 0.6 | 0.3 | 1 | 1 |
| | Bottom surface | — | 1 | 1 | 1 | 1 | 0.2 | 0.2 |
| Total width of conductive portion (mm) | | — | 1 | 1 | 1 | 1 | 2 | 1 |
| Thickness of tread rubber (mm) | | 8 | 8 | 8 | 8 | 8 | 8 | 8 |
| Steering stability | | 100 | 100 | 103 | 100 | 105 | 110 | 105 |
| Rolling resistance | | 103 | 105 | 103 | 101 | 105 | 110 | 110 |
| Wet braking performance | | 102 | 102 | 105 | 105 | 102 | 110 | 110 |
| Conducting performance | | X | ◯ | ◯ | ◯ | ◯ | ◯ | ◯ |

As shown in Table 1, in Working Examples 1 and 2, it is possible to favorably achieve the effect of reducing the rolling resistance and the effect of improving the wet braking performance while securing the steering stability, as compared with Conventional Example and Comparative Examples 1 to 4.

What is claimed is:

1. A pneumatic tire comprising:
a pair of bead portions;
side wall portions each of which extends to an outer side in a tire diametrical direction from each of the bead portions;
a tread portion which is connected to an outer end in the tire diametrical direction of each of the side wall portions;
a toroidal carcass layer which is provided between the pair of the bead portions; and
a tread rubber which is provided in an outer side of the carcass layer in the tread portion,
wherein the tread rubber has
a cap portion which is formed by a non-conductive rubber and constructs a ground-contacting surface,
a base portion which is provided in an inner side in the tire diametrical direction of the cap portion, and
a conductive portion which is formed by a conductive rubber and extends in a thickness direction of the tread rubber so as to reach a bottom surface of the tread rubber from the ground-contacting surface,
wherein a thickness of the conductive gradually increases from a first end in the thickness direction of the tread rubber to a center portion in the thickness direction of the tread rubber,
wherein the thickness of the conductive portion gradually decreases from the center portion in the thickness direction of the thread rubber to a second end in the thickness direction of the thread rubber, and
wherein the conductive portion is formed in an approximately crescent shape in a tire meridian cross-section.

2. The pneumatic tire according to claim 1, wherein one conductive portion appears on the tire meridian cross-section.

3. A pneumatic tire comprising:
a pair of bead portions;
side wall portions each of which extends to an outer side in a tire diametrical direction from each of the bead portions;
a tread portion which is connected to an outer end in the tire diametrical direction of each of the side wall portions;
a toroidal carcass layer which is provided between the pair of the bead portions; and
a tread rubber which is provide in an outer side of the carcass layer in the tread portion,
wherein the tread rubber has
a cap portion which is formed by a non-conductive rubber and constructs a ground-contacting surface,
a base portion which is provided in an inner side in the tire diametrical direction of the cap portion, and
a conductive portion which is formed by a conductive rubber and extends in a thickness direction of the tread rubber so s to reach a bottom surface of the tread rubber from the ground-contacting surface, and
wherein the conductive portion comprises a thick portion disposed a directly between a first thin portion and a second thin portion, the thick portion having a thickness in a direction perpendicular to a thickness direction of the tread rubber which is larger than the thickness of the first thin portion in the direction perpendicular to the thickness direction of the tread rubber and larger than the thickness of the second thin portion in the direction perpendicular to the thickness direction of the tread rubber,
wherein the thickness of the thick portion is uniform,
wherein the thickness of the first thin portion is uniform,
wherein the thickness of the second thin portion is uniform, and
wherein the conductive portion is formed in a lateral T-shaped form in a tire meridian cross-section.

4. The pneumatic tire according to claim 3, wherein one conductive portion appears on the tire meridian cross-section.

* * * * *